United States Patent
Wagener et al.

(10) Patent No.: US 12,500,953 B2
(45) Date of Patent: Dec. 16, 2025

(54) METHOD OF CONFIGURING A SPECIFIC FIELD DEVICE UTILIZING AN ORIGINAL OPEN PLATFORM COMMUNICATIONS UNIFIED ARCHITECTURE SERVER

(71) Applicant: ABB Schweiz AG, Baden (CH)

(72) Inventors: Dirk Wagener, Stadthagen (DE); Christian Fahrenholz, Memmingen (DE); Christoph Welte, Neu-Ulm (DE); Marcus Heege, Kaisersesch (DE)

(73) Assignee: ABB Schweiz AG, Baden (CH)

( * ) Notice: Subject to any disclaimer, the term of this patent is extended or adjusted under 35 U.S.C. 154(b) by 327 days.

(21) Appl. No.: 18/079,298

(22) Filed: Dec. 12, 2022

(65) Prior Publication Data

US 2023/0105045 A1   Apr. 6, 2023

Related U.S. Application Data

(63) Continuation of application No. PCT/EP2020/066360, filed on Jun. 12, 2020.

(51) Int. Cl.
*G05B 99/00* (2006.01)
*G05B 19/418* (2006.01)
*H04L 67/12* (2022.01)

(52) U.S. Cl.
CPC .......... *H04L 67/12* (2013.01); *G05B 19/4185* (2013.01)

(58) Field of Classification Search
CPC ............................................ G05B 2219/25428
See application file for complete search history.

(56) References Cited

U.S. PATENT DOCUMENTS

| 2009/0210814 A1* | 8/2009 | Agrusa | G05B 23/0267 |
| | | | 700/83 |
| 2009/0276486 A1* | 11/2009 | Tandon | G05B 19/4185 |
| | | | 710/8 |

(Continued)

FOREIGN PATENT DOCUMENTS

| CN | 101686458 A | 3/2010 |
| CN | 105681446 A | 6/2016 |

(Continued)

OTHER PUBLICATIONS

Graube et al., "Information Models in OPC UA and their Advantages and Disadvantages," *2017 22nd IEEE International Conference on Emerging Technologies and Factory Automation (ETFA)*, IEEE, 8 pp. (Sep. 12, 2017).

(Continued)

*Primary Examiner* — Suresh Suryawanshi
(74) *Attorney, Agent, or Firm* — Leydig, Voit & Mayer, Ltd.

(57) ABSTRACT

A method of configuring a field device includes identifying an original Open Platform Communications Unified Architecture (OPC UA) server provided for a field device of the same type; creating a data set of values of parameters of the original OPC UA server; storing the created data set of the values of parameters of the original OPC UA server in a storage medium separate to the original OPC UA server; and generating a configuration for the field device comprising utilizing the created data set of the values of parameters of the original OPC UA server in the storage medium separate to the original OPC UA server.

20 Claims, 1 Drawing Sheet

(56) References Cited

U.S. PATENT DOCUMENTS

| | | | | |
|---|---|---|---|---|
| 2010/0217448 A1* | 8/2010 | Dufaurre | ............ | G05B 19/4185 |
| | | | | 700/286 |
| 2010/0293363 A1* | 11/2010 | Meyer | ................ | G05B 19/0426 |
| | | | | 713/1 |
| 2014/0122855 A1* | 5/2014 | Maneval | ............ | G05B 19/0426 |
| | | | | 713/1 |
| 2015/0018006 A1* | 1/2015 | Pollmann | ................ | H04L 67/12 |
| | | | | 455/456.1 |
| 2019/0166202 A1* | 5/2019 | Nagata | ................ | G05B 19/048 |

FOREIGN PATENT DOCUMENTS

| | | | | |
|---|---|---|---|---|
| CN | 106453563 A | | 2/2017 | |
| CN | 110190997 A | | 8/2019 | |
| DE | 102015116381 A1 * | | 3/2017 | ......... G05B 19/0426 |

OTHER PUBLICATIONS

European Patent Office, International Search Report in International Patent Application No. PCT/EP2020/066360, 2 pp. (Oct. 23, 2020).
European Patent Office, Written Opinion in International Patent Application No. PCT/EP2020/066360, 8 pp. (Oct. 23, 2020).
The Patent Office of the People's Republic of China, Office Action in Chinese Patent Application No. 202080101852.3, 9 pp. (Feb. 28, 2025).

* cited by examiner

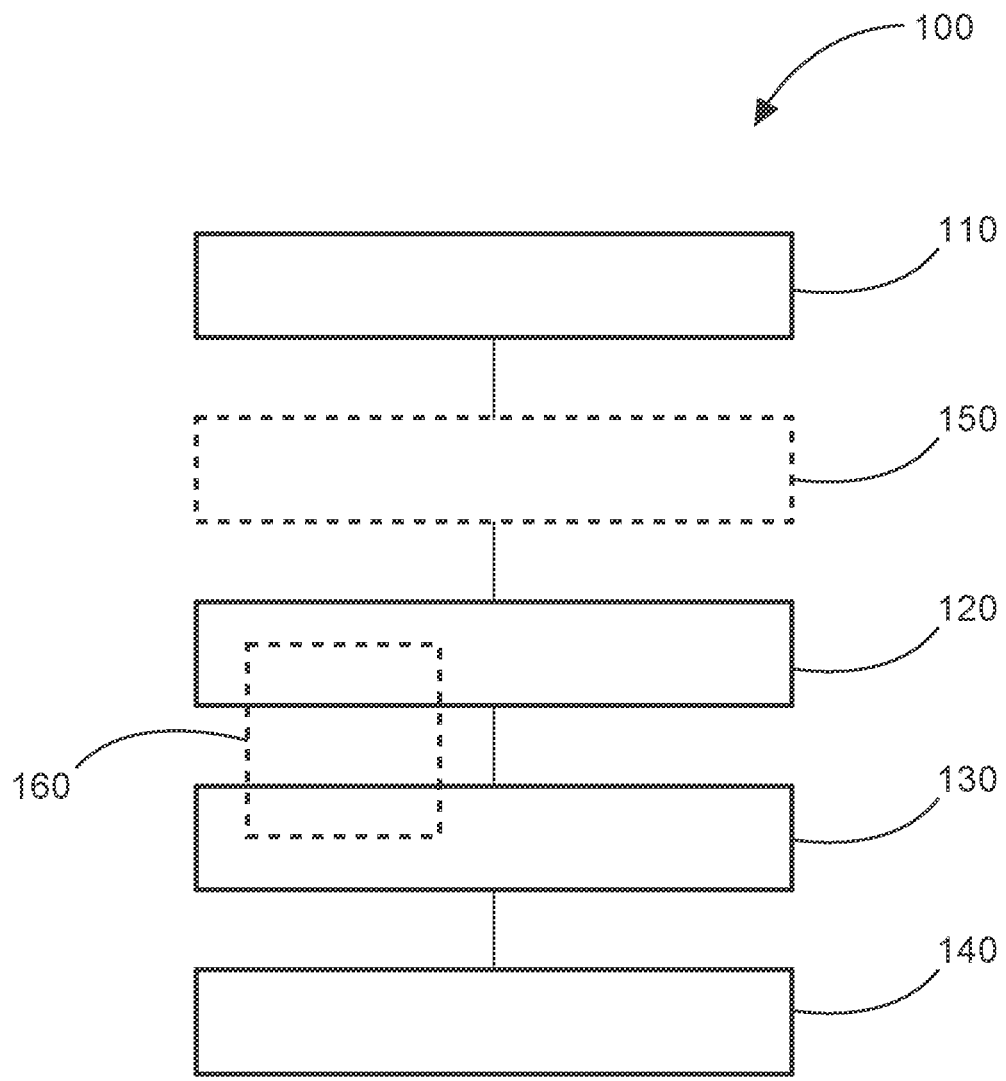

METHOD OF CONFIGURING A SPECIFIC FIELD DEVICE UTILIZING AN ORIGINAL OPEN PLATFORM COMMUNICATIONS UNIFIED ARCHITECTURE SERVER

CROSS-REFERENCE TO RELATED APPLICATIONS

This patent application claims priority to International Patent Application No. PCT/EP2020/066360, filed on Jun. 12, 2020, which is incorporated herein in its entirety by reference.

FIELD OF THE DISCLOSURE

The present disclosure relates to a method of configuring a field device, one or more computer programs, a non-transitory computer storage medium, a download product, one or more computers with the one or more computer programs, one or more computers with the non-transitory computer storage medium, and one or more computers with the download product.

BACKGROUND OF THE INVENTION

Industrial plants are fitted with numerous field devices, with communication protocols such as Highway Addressable Remote Transducer (HART) protocol, Fieldbus Foundation, Profibus or ProfiNet and can be configured based on Electronic Device Descriptions (EDDs) or Field Device Integration (FDI) packages.

Field devices can have provided Open Platform Communications Unified Architecture (OPC UA) servers with parameters usable to configure the field devices, e.g. on Edge devices and indeed some field devices can have embedded OPC UA servers.

However, if the OPC UA server is off-line or the field device with the embedded OPC UA server is off-line, then it is not possible to configure the field device.

BRIEF SUMMARY OF THE INVENTION

In a general aspect, the present disclosure is directed a method and computer system for improving configuration techniques for field devices. In one more particular aspect, the present disclosure describes a method of configuring a field device, the method comprising the steps of: identifying an original Open Platform Communications Unified Architecture "OPC UA" server provided for a field device of the same type; creating a data set of values of parameters of the original OPC UA server; storing the created data set of the values of parameters of the original OPC UA server in a storage medium separate to the original OPC UA server; and generating a configuration for the field device comprising utilizing the created data set of the values of parameters of the original OPC UA server in the storage medium separate to the original OPC UA server.

In the embodiments described in the present disclosure, a configuration can be generated for a field device when the OPC UA server provided for the particular field device is off-line because, in effect, a twin of the OPC Server is generated, from which the required parameters are stored, which enables the field device configuration to be generated. Thus, field devices can be configured using OPC UA in offline mode.

BRIEF DESCRIPTION OF THE SEVERAL VIEWS OF THE DRAWING

FIG. 1 is a flowchart for a method of configuring a field device in accordance with the disclosure.

DETAILED DESCRIPTION OF THE INVENTION

FIG. 1 is a flowchart of a method 100 for configuring a field device. In the flowchart, essential steps are shown in bold lines and optional step(s) are shown in dashed lines. The method 100 of configuring a field device, shown in FIG. 1, comprises the steps of:
  identifying 110 an original Open Platform Communications Unified Architecture "OPC UA" server provided for a field device of the same type;
  creating 120 a data set of values of parameters of the original OPC UA server;
  storing 130 the created data set of the values of parameters of the original OPC UA server in a storage medium separate to the original OPC UA server; and
  generating 140 a configuration for the field device comprising utilizing the created data set of the values of parameters of the original OPC UA server in the storage medium separate to the original OPC UA server.

Thus, for example for the creation of the values of parameters, data for a field device can be used for all devices of the same type.

In this manner, by using a field device of the same type, in the situation where the original OPCUA server was not yet connected to the system, the data can be fetched from such a device of the same type).

According to an example, the field device comprises the original OPC UA server.

According to an example, the method comprises the step of sending the configuration to the field device or another field device of the same type when the field device is online.

According to an example, the method comprises the step of fetching 150 the data set of values of parameters of the original OPC UA server from the original OPC UA server.

According to an example, the method comprises the step of fetching the data set of values of parameters of the original OPC UA server from a device of the same type.

According to an example, the method comprises the step of fetching the data set of values of parameters of the original OPC UA server from a reference data store.

According to an example, the steps of creating 120 the data set of values of parameters of the original OPC UA server and of storing 130 the created data set of the values of parameters of the original OPC UA server in the storage medium separate to the original OPC UA server comprise creating 160 a digital twin of the original OPC UA server.

According to an example, the method comprises the step of creating data set of the values of parameters of the original OPC UA server in the storage medium separate to the original OPC UA server with the original OPC UA server.

According to an example, the values of parameters are managed in templates.

According to an example, the method comprises the step of configuring one or more further field devices that are instances of the field utilizing the created data set of the values of parameters of the original OPC UA server in the storage medium separate to the original OPC UA server.

From the above, it is clear that one or more computer programs, comprising machine-readable instructions that, can be provided which when executed on one or more computers, cause the one or more computers to perform the method 100.

Also, from the above it is clear that a non-transitory computer storage medium, and/or a download product, can comprises the one or more computer programs.

One or more computers can then operate with the one or more computer programs.

One or more computers can then comprise the non-transitory computer storage medium and/or the download product.

Thus, today's intelligent field devices with communication protocols like HART, Fieldbus Foundation, Profibus or ProfiNet can be configured based on EDDs or FDI Device Packages, and it is possible to do the configuration with a connected device (online) or without a connected device (offline), just based on the description of the EDD. Later the configuration can be sent to the device.

Also, recently field devices with an embedded OPC UA server for the configuration of the device are seen, where tools exist (e.g. UA Expert) to connect with the OPC UA server and to browse and modify parameters of the field device. However, now the configuration can be generated when the field device and its embedded OPC UA server are offline, and again the configuration sent to the field device when it is back online.

Furthermore, all field devices can be handled in the same way using the new configuration method.

Thus, information about the structure and content of the OPC UA server is used in order to configure the field device even if it is not available (offline). For each type of field device the information needed for the offline configuration is fetched once from an available (online) OPC UA server of the field device and then used for all other instances of this field device type.

Thus, in a specific embodiment, based on the fetched information from the original OPC UA server, a digital twin of the OPC UA server is created. During the creation of the digital twin a set of values for the parameters of the OPC UA server are created from the data of the original OPC UA server. At this point in time all activities will be done with the digital twin, in other words independent of the availability of the original OPC UA server. On certain situations the data between the digital twin and the original OPC UA server will be synced.

While the invention has been illustrated and described in detail in the drawing and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the field device comprises the original OPC UA server.

In other words, the field device has an embedded OPC UA server.

To put this another way, the OPC UA server can form part of the field device, and the field device and its provided OPC UA server can be off-line, but a configuration for the field device can still be generated and then sent to the field device when the field device is connected or in other words is back online. Thus, field devices can be configured even if they are not physically installed, that means not visible in the topology. In this case the configuration can be done offline based on the type and the set of parameters (template) of the field device.

In other words, parameters of the field device can be fetched from one instance and these can be used as default parameters for all devices of the same type.

In an example, the method comprises sending the configuration to the field device or another field device of the same type when the field device is online.

In this manner the OPC UA server can be off-line and be separate to the field device, or the field device with its embedded OPC UA server can be off-line with the OPC UA server then also being off-line, but a configuration can still be generated for the field device and sent to the field device as soon as it is back online or connected.

In an example, the method comprises the step of fetching the data set of values of parameters of the original OPC UA server from the original OPC UA server.

In other words, the parameters are fetched are extracted from the OPC UA server provided for the field device, whether it is separate to the field device always an embedded feature of the field device, and these parameters are stored in effect as a digital twin enabling the field device configuration to be generated in all situations.

In an example, the method comprises the step of fetching the data set of values of parameters of the original OPC UA server from a device of the same type.

In an example, the method comprises the step of fetching the data set of values of parameters of the original OPC UA server from a reference data store.

To put this another way, the actual OPC UA server provided for the field device does not need to be interrogated in order to fetch the parameters, but reference stores of information with these parameters can be accessed in order to provide a digital twin of the OPC UA server that in effect never sleeps. This enables a configuration for the field device to be generated even when the OPC UA server is off-line, whether it is separate to or part of the field device.

In an example, the steps of creating the data set of values of parameters of the original OPC UA server and of storing the created data set of the values of parameters of the original OPC UA server in the storage medium separate to the original OPC UA server comprise creating a digital twin of the original OPC UA server.

In an example, the method comprises the step of creating the data set of the values of parameters of the original OPC UA server in the storage medium separate to the original OPC UA server with the original OPC UA server.

According to an example, the values can be managed in templates.

Thus, dependent upon certain situations, the data between the digital twin and the original OPC UA server will be synced.

In an example, the method comprises the step of configuring one or more further field devices that are instances of the field utilizing the created data set of the values of parameters of the original OPC UA server in the storage medium separate to the original OPC UA server.

In a second aspect, there is provided one or more computer programs, comprising machine-readable instructions that, when executed on one or more computers, cause the one or more computers to perform the method according to the first aspect.

In an third aspect, there is provided a non-transitory computer storage medium, and/or a download product, with the one or more computer programs according to the second aspect.

In a fourth aspect, there is provided one or more computers with the one or more computer programs according to the second aspect.

In a fifth aspect, there is provided one or more computers with the non-transitory computer storage medium and/or the download product according to the third aspect.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of configuring a specific field device, the method comprising the steps of:
   identifying an original Open Platform Communications Unified Architecture (OPC UA) server provided for a field device of the same type as the specific field device;
   creating a data set of values of parameters of the original OPC UA server;
   storing the created data set of the values of parameters of the original OPC UA server in a non-transitory storage medium separate to the original OPC UA server; and
   generating a configuration for the specific field device comprising utilizing the created data set of the values of parameters of the original OPC UA server in the non-transitory storage medium separate to the original OPC UA server.

2. The method according to claim 1, wherein the specific field device comprises the original OPC UA server.

3. The method according to claim 1, wherein the method comprises sending the configuration to the specific field device when the specific field device is online.

4. The method according to claim 1, wherein the method comprises sending the configuration to another field device of the same type as the specific field device when the specific field device is online.

5. The method according to claim 1, wherein the method further comprises the step of fetching the data set of values of parameters of the original OPC UA server from the original OPC UA server.

6. The method according to claim 1, wherein the method further comprises the step of fetching the data set of values of parameters of the original OPC UA server from a device of the same type as the specific field device.

7. The method according to claim 1, wherein the method further comprises the step of fetching the data set of values of parameters of the original OPC UA server from a reference data store.

8. The method according to claim 1, wherein the steps of creating the data set of values of parameters of the original OPC UA server and of storing the created data set of the values of parameters of the original OPC UA server in the non-transitory storage medium separate to the original OPC UA server further comprise creating a digital twin of the original OPC UA server.

9. The method according to claim 1, wherein the method further comprises the step of creating the data set of the values of parameters of the original OPC UA server in the non-transitory storage medium separate to the original OPC UA server.

10. The method according to claim 9, wherein the values are managed in templates.

11. The method according to claim 1, comprising the step of configuring one or more further field devices that are instances of the field utilizing the created data set of the values of parameters of the original OPC UA server in the non-transitory storage medium separate to the original OPC UA server.

12. One or more computer programs comprising machine-readable instructions stored in non-transitory tangible media that, when executed on one or more computers, cause the one or more computers to configure a specific field device by performing the following steps:
   identify an original Open Platform Communications Unified Architecture (OPC UA) server provided for a field device of the same type as the specific field device;
   create a data set of values of parameters of the original OPC UA server;
   store the created data set of the values of parameters of the original OPC UA server in a non-transitory storage medium separate to the original OPC UA server; and
   generate a configuration for the specific field device comprising utilizing the created data set of the values of parameters of the original OPC UA server in the non-transitory storage medium separate to the original OPC UA server.

13. The one or more computer programs according to claim 12, wherein the specific field device comprises the original OPC UA server.

14. The one or more computer programs according to claim 12, wherein the machine-readable instructions further cause the one or more computers to perform the step of sending the configuration to the specific field device when the specific field device is online.

15. The one or more computer programs according to claim 12, wherein the machine-readable instructions further cause the one or more computers to perform the step of sending the configuration to another field device of the same type as the specific field device when the specific field device is online.

16. The one or more computer programs according to claim 12, wherein the machine-readable instructions further cause the one or more computers to perform the step of fetching the data set of values of parameters of the original OPC UA server from the original OPC UA server.

17. The one or more computer programs according to claim 12, wherein the machine-readable instructions further cause the one or more computers to perform the step of fetching the data set of values of parameters of the original OPC UA server from a device of the same type as the specific field device.

18. The one or more computer programs according to claim 12, wherein the machine-readable instructions further cause the one or more computers to perform the step of fetching the data set of values of parameters of the original OPC UA server from a reference data store.

19. The one or more computer programs according to claim 12, wherein the steps of creating the data set of values of parameters of the original OPC UA server and of storing the created data set of the values of parameters of the original OPC UA server in the non-transitory storage medium separate to the original OPC UA server further comprise machine-readable instructions for creating a digital twin of the original OPC UA server.

20. The one or more computer programs according to claim 12, wherein the machine-readable instructions further cause the one or more computers to perform the step of creating the data set of the values of parameters of the original OPC UA server in the non-transitory storage medium separate to the original OPC UA server with the original OPC UA server.

\* \* \* \* \*